United States Patent [19]

Castrantas et al.

[11] 3,859,223

[45] Jan. 7, 1975

[54] STABLE DRY CLEANING BLEACH COMPOSITION

[75] Inventors: Harry Marcus Castrantas, Trenton, N.J.; Robert Ellsworth Keay, State College, Pa.

[73] Assignee: FMC Corporation, New York, N.Y.

[22] Filed: May 26, 1972

[21] Appl. No.: 257,171

Related U.S. Application Data

[63] Continuation-in-part of Ser. No. 57,812, July 23, 1970, abandoned.

[52] U.S. Cl.......................... 252/104, 8/101, 8/111, 8/139.1, 8/142, 252/170, 252/171
[51] Int. Cl.................................................. C11d 7/54
[58] Field of Search........ 252/104, 170, 171; 8/142, 8/139.1, 101, 111

[56] References Cited
UNITED STATES PATENTS

| | | | |
|---|---|---|---|
| 2,022,860 | 12/1935 | Kunz | 252/186 X |
| 2,886,532 | 5/1959 | Richmond et al. | 252/104 |
| 3,387,939 | 6/1968 | Reilly et al. | 252/186 X |
| 3,539,522 | 11/1970 | Lindner | 252/171 X |
| 3,635,667 | 1/1972 | Keay et al. | 8/142 |
| 3,677,955 | 7/1972 | Castrantas et al. | 252/104 X |
| 3,681,022 | 8/1972 | Kibbel, Jr. et al. | 23/207.5 |
| 3,708,260 | 1/1973 | Marshall et al. | 252/104 X |

OTHER PUBLICATIONS

Atlas Chemical Industries, "Stability of H O with Atlas Surfactants," published 8/64.

*Primary Examiner*—Mayer Weinblatt

[57] ABSTRACT

Stable dry cleaning bleach compositions containing perchloroethylene, anionic surfactant emulsifier, and aqueous hydrogen peroxide stabilized against deterioration on dilution with tap water.

4 Claims, No Drawings

STABLE DRY CLEANING BLEACH COMPOSITION

RELATED APPLICATIONS

This application is a continuation-in-part of our application Ser. No. 57,812 of July 23, 1970 now abandoned.

BACKGROUND OF THE INVENTION

In cleaning textiles, particularly garmets, which are not resistant to ordinary washing with aqueous detergents, the general practice is to expose them to a non-aqueous solvent liquid containing a small amount (generally 0.5 to 5.0%) of a suitable detergent, a very small amount (from about 0.02 to 0.2%) of water, using a large ratio of solvent to cloth, of the order of 5 or more to 1. The combination of water and detergent with solvent permits solubilization of water-soluble soils, as well as solvent-soluble soils, and greatly enhances the cleaning action of the solvents. Typical solvents employed are petroleum distillates and chlorinated solvents such as trichloroethylene and perchloroethylene.

A major difficulty with dry cleaning is its poor performance with white goods. In aqueous washing, bleaches such as chlorine or hydrogen peroxide are conventionally used; but chlorine cannot be used in dry cleaning, and hydrogen peroxide has not been widely used for a number of reasons.

Limited use has been made abroad of peroxide compositions containing mineral spirits, water, an emulsifying agent and hydrogen peroxide; this is mixed with the dry cleaning bath, and permits bleaching of white goods. However, the product lacks active oxygen stability to a sufficient degree so that erratic results are obtained, and it has never come into extensive use.

This problem of stability is discussed in Richmond et al. U.S. Pat. No. 2,886,532, who claim to have solved the problem by using a highly aromatic hydrocarbon along with a nonionic detergent and hydrogen peroxide. However, the product of this patent has not found commercial acceptance, apparently due to the odor problems associated with aromatic hydrocarbons, and to the solvency and pollution problems associated with the introduction of the foreign aromatic solvents, in varying amounts, into the perchloroethylene solvent system.

A survey of dry cleaners indicates that they would like a bleach composition which blends readily with their dry cleaning baths, which is stable enough to give consistent results in their baths, and which does not introduce contaminants which are not removable by their ordinary procedures of regular filtration with occasional distillation. It is the principal object of the present invention to provide such compositions.

STATEMENT OF THE INVENTION

We have found, contrary to the teaching of the art that chlorinated solvents do not produce chemically stable emulsions with hydrogen peroxide, that emulsions of aqueous hydrogen peroxide can be prepared which are both physically and chemically stable, and that, surprisingly, in such compositions the hydrogen peroxide acts in much the same fashion as it does on dilution with tap water containing metallic impurities. By using hydrogen peroxide which has been stabilized against decomposition on dilution with such tap water containing metallic impurities, we produce physically and chemically stable emulsions containing about 20 to 40% by weight of stabilized aqueous hydrogen peroxide of 25 to 70% concentration along with about 25 to 50% by weight of perchloroethylene and 75 to 150%, based on perchloroethylene, of an anionic surfactant soluble in the perchloroethylene which is nonreactive with hydrogen peroxide, and is both a detergent and emulsifier for water-in-oil systems.

In use, the compositions are added to a regular perchloroethylene dry cleaning bath, in proportions to yield a desired peroxide concentration in the final bath, perferably as described in our copending application entitled "Dry Cleaning With Hydrogen Peroxide", Ser. No. 57,817, filed July 23, 1970 now U.S. Pat. No. 3,635,667.

DETAILED DESCRIPTION OF THE INVENTION

The art indicates that hydrogen peroxide emulsified in perchloroethylene is chemically unstable. We have found that this is a dilution effect, probably catalyzed by trace impurities in the perchloroethylene and surfactant, and that the problem can be overcome by using known methods for stabilizing hydrogen peroxide against dilution in tap water containing metallic impurities. This is quite surprising, since hydrogen peroxide is in solution in the diluting water, and is emulsified in perchloroethylene. Satisfactory hydrogen peroxides are shown in the copending Kibbel et al. application Ser. No. 33,928, filed May 1, 1970, and entitled "Manufacture of Stable Hydrogen Peroxide Solutions", and in Reilly et al. U.S. Pat. No. 3,387,939 issued June 11, 1968.

In accordance with U.S. patent application Ser. No. 33,928, filed May 1, 1970, stabilized hydrogen peroxide is prepared by first preparing an aqueous alkali metal stannate solution containing 0.5 to 3% of tin, reducing the pH solely with nitrilo trimethylene phosphonic acid to 10.75 ± 0.25, mixing this solution with a hydrogen peroxide solution under conditions which keep the pH of the hydrogen peroxide below 5.5 at all times, to give a tin concentration of 275 to 325 ppm based on 35 weight percent hydrogen peroxide, and then adjusting the pH of the hydrogen peroxide close to the normal level for its concentration solely with nitrilo trimethylene phosphonic acid, said normal pH being 3.0 ± 0.25 for 35% hydrogen peroxide. The normal levels for other concentrations are about 0.75 ± 0.25 at 90% concentration, and 1.80 ± 0.20 at 70% concentration and go up to 5.0 ± 0.5 at 6% concentration.

The method of the Reilly et al. patent involves providing an aqueous solution of a soluble stannate from the group consisting of ammonium and the alkali metal stannates, said solution containing 0.5 to 40% by weight of said stannate, calculated as $Na_2SnO_3 \cdot 3H_2O$, and adding to said solution an alkylidene diphosphonic acid of the formula

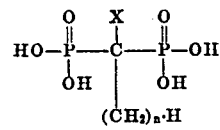

wherein X is hydrogen or the hydroxyl radical and $n$ is a whole number from 0 to 5, in an amount sufficient to adjust the pH of said solution to a pH in the range of 8 to 11.0, and mixing said stabilizer solution with the hydrogen peroxide to be stabilized. The preferred alkylidene diphosphonic acid of the patent is 1-hydroxyethylidene diphosphonic acid.

If desired additional known peroxide stabilizers may be added, such as phenacetin, hydroquinone, and the like. They are not necessary to get satisfactory results, but are useful where very long storage periods are contemplated.

The hydrogen peroxide is employed at from about 25 to 70% in water, and will comprise about 20 to 40% by weight of the total composition.

The perchloroethylene will comprise about 25 to 50% by weight of the total composition, the balance being an anionic surfactant in amount from about 75% to 150% of the weight of the perchloroethylene.

The anionic surfactant must of course be soluble in the perchloroethylene, and in addition be both a detergent (for utility in the cleaning process) and a water-in-oil emulsifier (for utility in keeping the aqueous hydrogen peroxide in stable emulsion form) and nonreactive with hydrogen peroxide. As a general rule, surfactants which are truly water soluble are not good water-in-oil emulsifiers, since they tend to distribute to too great an extent into the water phase. We have successfully used the isopropyl amine salt of dodecyl benzene sulfonate (Atlas G-711);
ammonium salt of a sulfate ester of an alkylphenoxypoly(ethyleneoxy) ethanol (Alipal CO-436);
the sodium salt of a long chain alcohol sulfate, (Duponol L-144WDG);
sodium sulfosuccinate (Emcol 4776);
organic phosphate ester (Emcol CS-1362);
partial sodium salt of complex organic aromatic phosphate ester (GAFAC LO-529);
free acid of a complex organic aromatic phosphate ester (GAFAC RM-510 or GAFAC RM-710); and
natural sodium petroleum sulfonate (Morco M-70).

The specific surfactants used are not part of the instant invention; it is only necessary that they be anionic detergents soluble in perchloroethylene and be water-in-oil emulsifiers.

Storage tests of typical compositions made in accordance with this invention, for 6 months at 25°C., gave peroxide retention of from about 70 to 90%, depending on the ratio of ingredients, and the nature of the stabilizing treatment. Additional stabilizer improved the less stable products somewhat, the more stable products but little. In contrast, hydrogen peroxide containing ordinary stabilizers, not specially stabilized against dilution, had peroxide retention of only about 20 to 30% in the same period.

In using these compositions in dry cleaning, they are generally added to standard perchloroethylene dry cleaning compositions to give from about 0.5 to 1.5% hydrogen peroxide based on weight of fabric (W.O.F.), although amounts from about 0.25 to 2.5% can be used to get results without fabric damage, as disclosed in our copending application Ser. No. 57,817, filed July 23, 1970, and entitled "Dry Cleaning With Hydrogen Peroxide".

It is of course not essential that our stabilized emulsions be used to get the optimum results described and claimed in our copending application. However, much more effective results are obtained by using a volatile alkali to make the aqueous phase of the dry cleaning bath neutral to alkaline, and by using at least twice as much water as peroxide in the bath, as therein disclosed.

SPECIFIC EXAMPLES OF THE INVENTION

The following specific examples of the invention are given by way of illustration and not by way of limitation.

EXAMPLE 1

25 grams of perchloroethylene and 35 grams of isopropyl amine salt of dodecyl benzene sulfonate were shaken in a flask to dissolve the detergent emulsifier, 40 grams of 35% hydrogen peroxide, stabilized in accordance with Example 1 of Kibble et al., U.S. patent application Ser. No. 33,928, filed May 1, 1970, and entitled "Manufacture of Stable Hydrogen Peroxide Solutions", were added, and the flask again gently shaken. A stable emulsion was obtained, which retained 78% of its hydrogen peroxide after 6 months storage at 25°C.

EXAMPLE 2

Example 1 was repeated and 0.25 grams of phenacetin was added to the finished emulsion. After 90 minutes of stirring, the phenacetin had dissolved. This product had 90% peroxide retention after 6 months at 25°C.

EXAMPLE 3

Example 1 was repeated, using 50% stabilized peroxide in place of the 35% peroxide. Retention of peroxide after 6 months was 90%.

EXAMPLE 4

Example 1 was repeated using 35% dilution grade hydrogen peroxide prepared in accordance with Example 4 of U.S. Pat. No. 3,387,939, of June 11, 1968. A stable emulsion was obtained which retained 73% of its hydrogen peroxide after 6 months storage at 25°C.

EXAMPLE A (FOR COMPARISON)

Example 1 was repeated using 35% regular grade hydrogen peroxide stabilized for ordinary use, but not for dilution with tap water. A physically stable emulsion was prepared which retained only 32% of its hydrogen peroxide after 6 months storage at 25°C.

EXAMPLE 5

Example 1 was repeated using 35 grams of a mixed mono- and di-phosphate ester (sodium salt, 2/1 ratio of mono- to di-ester). A stable emulsion was obtained which retained 80% of its hydrogen peroxide after 6 months storage at 25°C.

EXAMPLE 6

5 grams of perchloroethylene and 5 grams of Duponol L-144WDG (a long chain alcohol sulfate Na salt), a detergent emulsifier, were shaken in a flask to dissolve the detergent emulsifier and 5 grams of 50% hydrogen peroxide stabilized in accordance with Example 1 of Kibbel et al., U.S. patent application Ser. No. 33,928, filed May 1, 1970, and entitled "Manufacture of Stable Hydrogen Peroxide Solutions" were added, and the flask again partly shaken. A stable emulsion was obtained which retained 84% of its hydrogen peroxide after 6 months storage at 25°C.

EXAMPLE 7

Example 6 was repeated using Emcol 4776, a sodium sulfosuccinate, in place of Duponol L-144WDG. A colorless solution resulted which retained 92% of the peroxide after 6 months at 25°C.

EXAMPLE 8

Example 6 was repeated using Morco M-70, a petroleum sulfonate. A clear amber solution resulted which retained 83% of the peroxide after 6 months at 25°C.

EXAMPLE 9

Example 6 was repeated using Alipal CO-436 (ammonium salt of a sulfate ester of an alkylphenoxy polyethyleneoxy) ethanol. A clear yellow gel resulted which retained 89% of the peroxide after 6 months at 25°C.

EXAMPLE 10

Example 6 was repeated using GAFAC RM-710, an aromatic phosphate ester (acid form). A clear yellow gel resulted which retained 91% of the peroxide after 6 months at 25°C.

EXAMPLE 11

Example 6 was repeated using GAFAC RM-510, a free acid of a complex organic phosphate. A clear yellow gel resulted that retained 93% of the peroxide after 6 months at 25°C.

EXAMPLE 12

Example 6 was repeated using GAFAC LO-529, a sodium salt of a complex organic phosphate ester. A clear colorless gel resulted that retained 91% of the peroxide after 6 months at 25°C.

EXAMPLE 13

Example 6 was repeated using Emcol CS-1362, an organic phosphate ester. A clear colorless gel resulted that retained 89% of the peroxide after 6 months at 25°C.

Obviously, the examples can be multiplied without departing from the invention as defined in the claims.

What is claimed is:

1. A chemically and physically stable emulsion consisting essentially of from 25 to 50% by weight of perchloroethylene, from 20 to 40% of an aqueous hydrogen peroxide of 25 to 70% concentration stabilized with a stannate against decomposition due to dilution with tap water containing metallic impurities, and an anionic surfactant soluble in the perchloroethylene and which is both a detergent and emulsifier for water-in-oil systems in amounts of 75 to 150% of the weight of the perchloroethylene.

2. The composition of claim 1, which contains in addition a fraction of a percent of a stabililzer for hydrogen peroxide of the group consisting of phenacetin and hydroquinone.

3. The composition of claim 1, in which the hydrogen peroxide used has been stabilized against decomposition by preparing an aqueous alkali metal stannate solution containing 0.5 to 3% of tin, reducing the pH solely with nitrilo trimethylene phosphonic acid to $10.75 \pm 0.25$, mixing this solution with a hydrogen peroxide solution under conditions which keep the pH of the hydrogen peroxide below 5.5 at all times, to give a tin concentration of 275 to 325 ppm based on 35 weight percent hydrogen peroxide, and then adjusting the pH of the hydrogen peroxide close to the normal level for its concentration solely with nitrilo trimethylene phosphonic acid, said normal pH being $3.0 \pm 0.25$ for 35 percent hydrogen peroxide.

4. The composition of claim 1, in which the hydrogen peroxide used has been stabilized against decomposition by providing an aqueous solution of a soluble stannate from the group consisting of ammonium and the alkali metal stannates, said solution containing 0.5 to 40% by weight of said stannate, calculated as $Na_2SnO_3 \cdot 3H_2O$, and adding to said solution an alkylidene diphosphonic acid of the formula

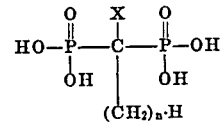

wherein X is hydrogen or the hydroxyl radical and $n$ is a whole number from 0 to 5, in an amount sufficient to adjust the pH of said solution to a pH in the range of 8 to 11.0, and mixing said stabilizer solution with the hydrogen peroxide to be stabilized.

* * * * *